A. HIGLEY.

Car-Axle Boxes.

No. 5,453. Reissued June 17, 1873.

*Witnesses.*

A. F. Cornell.

E. M. Perkins

*Inventor.*

Aaron Higley

Per Burridge & Co.

Attys.

UNITED STATES PATENT OFFICE.

AARON HIGLEY, OF CLEVELAND, OHIO, ASSIGNOR TO HIGLEY CAR-JOURNAL COMPANY.

IMPROVEMENT IN CAR-AXLE BOXES.

Specification forming part of Letters Patent No. 86,543, dated February 2, 1869; reissue No. 5,453, dated June 17, 1873; application filed December 18, 1872.

*To all whom it may concern:*

Be it known that I, AARON HIGLEY, of Cleveland, in the county of Cuyahoga and State of Ohio, formerly of South Bend, in the county of St. Joseph and State of Indiana, have invented certain new and useful Improvements in Railroad-Car Axle-Boxes; and I do hereby declare that the following is a full, clear, and complete description thereof, reference being had to the accompanying drawings making part of the same.

Figure 1:
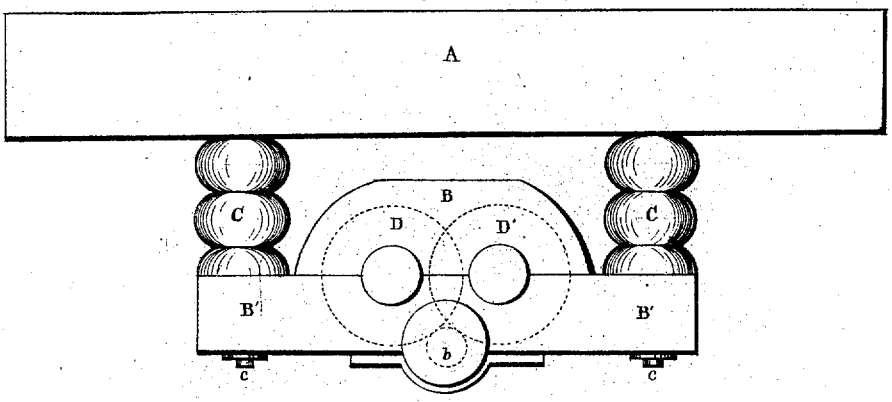
Figure 2:
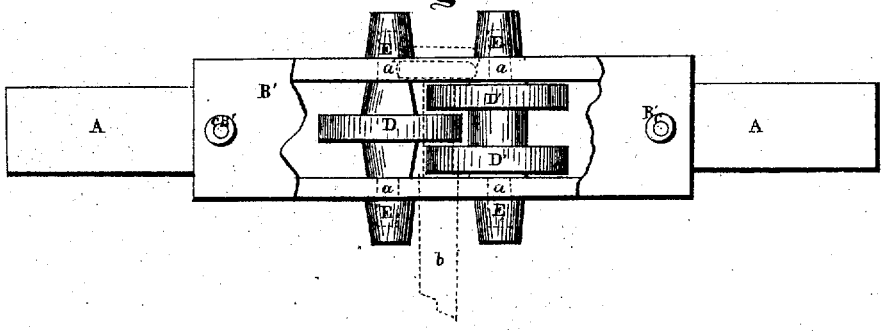
Figure 3:
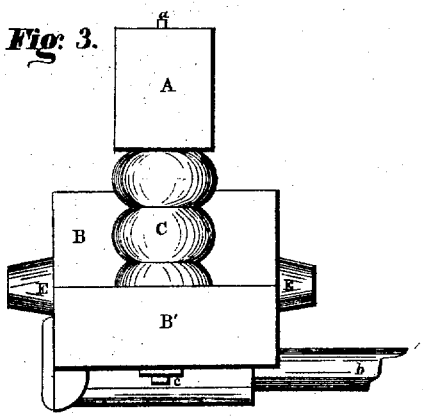

Figure 1 is a side view of the box. Fig. 2 is a view of the under side. Fig. 3 is an end view.

Like letters of reference refer to like parts in the several views.

I am aware that friction-rollers have been known and used for journal-bearings, and these I do not claim, considered in themselves; but what distinguishes my improvement, and is the nature thereof, consists in interlapping friction rolls or rollers, arranged in a frame or housing, and forming a box or bearing for railway-car axle-journals.

In Fig. 1, A represents a car or truck sill, to the under side of which is secured the journal-box case B, with interposed rubber springs C between them, and on which the sill rests. Said box is so constructed and arranged that one side and the bottom can be removed for the admission of the friction-rollers D D′, which, as will be seen, are arranged transversely in the box. The journals of said rollers have their bearings in the sides of the box, extending through into the projections E. It will be observed that the roller D′ is double, or two rollers on one shaft, and so arranged on the shaft that they have a space between them, into which the roller D is received, as shown in the drawing Fig. 2; also indicated by the dotted lines in Fig 1.

In Figs. 2 and 3, *b* is the car-axle, upon which, as will be seen in Fig. 2, rests the rollers D D′, said rollers forming the seat or bearing for the axle-journal.

The weight and friction is equally distributed upon the journals of the said rollers, and prevents the bearings or journal-box from twisting or turning out of line with the axles; also prevents the axle-journals from wearing unequally, or cutting by the rollers twisting out of line. By the interlapping of the rollers the journals thereof are brought more directly over the center of the axles, thereby reducing the friction on all the journals.

In the application of this journal to the car, a pedestal may or may not be used in order to connect it to the sill. This box is connected to the sill of the car or truck by means of the arms B′ extending from the case, and the bolts *c c*, the sill resting directly upon the springs, and arms B′ thereto secured by the bolts *c*. The rods or bolts *c c* fit loosely in the springs and arms B, so as to allow the box to work or move according to the motion of the car.

What I claim as my invention, and desire to secure by Letters Patent, is—

1. The interlapping friction rolls or rollers D D′, case B, arms B′, and springs C, all arranged to operate in the manner as and for the purpose substantially described.

2. The interlapping friction-rollers D D′ having two points of bearing for the axle upon one roller, and one point of bearing upon the other, or the equivalent of the same, the object being to throw an equal bearing upon the journals of the friction-rollers, substantially as and for the purpose specified.

HIGLEY CAR-JOURNAL CO.,
By AARON HIGLEY, *President.*

Witnesses:
J. H. BURRIDGE,
A. F. CORNELL.